United States Patent
Jansen et al.

(10) Patent No.: US 6,770,173 B1
(45) Date of Patent: Aug. 3, 2004

(54) COLUMN PARTITION (75) Inventors: Helmut Jansen, Dormagen (DE); Jochen Leben, Düsseldorf (DE); Thomas Rietfort, Bottrop (DE); Egon Zich, Leichlingen (DE)

(73) Assignee: Julius Montz GmbH, Hilden (DE)

( * ) Notice: Subject to any disclaimer, the term of this patent is extended or adjusted under 35 U.S.C. 154(b) by 157 days.

(21) Appl. No.: 09/672,252

(22) Filed: Sep. 28, 2000

(30) Foreign Application Priority Data

Sep. 30, 1999 (DE) .......................................... 199 47 246

(51) Int. Cl.[7] ................................................. B01D 3/14
(52) U.S. Cl. ...................... 202/158; 196/111; 196/115; 196/137; 202/270; 422/243; 159/27.2
(58) Field of Search ................................ 202/158, 270; 196/111, 115, 137; 422/205, 243; 403/52; 159/DIG. 42, 28.5, 28.2, 27.2

(56) References Cited

U.S. PATENT DOCUMENTS

| | | | | |
|---|---|---|---|---|
| 3,228,859 A | * | 1/1966 | Frankel et al. ............... 202/173 |
| 5,423,952 A | * | 6/1995 | Stout ............................ 202/174 |
| 5,585,046 A | * | 12/1996 | Jansen et al. .................. 261/97 |
| 5,694,729 A | * | 12/1997 | Blackburn et al. .......... 52/582.2 |
| 5,785,819 A | * | 7/1998 | Kaibel et al. ................ 202/158 |
| 5,914,012 A | * | 6/1999 | Kaibel et al. ................ 202/158 |
| 6,165,325 A | * | 12/2000 | Sjoberg et al. .............. 202/158 |

FOREIGN PATENT DOCUMENTS

| | | |
|---|---|---|
| DE | 31 35 709 | 4/1983 |
| DE | 43 36 983 | 5/1995 |
| DE | 43 36 985 | 5/1995 |
| DE | 43 36 986 | 5/1995 |
| EP | 0 122 367 | 10/1984 |
| EP | 0755707 | * 1/1997 |
| EP | 196 17 210 | 11/1997 |

* cited by examiner

*Primary Examiner*—Virginia Manoharan
(74) *Attorney, Agent, or Firm*—Herbert Dubno (57) ABSTRACT

Partitions for columns for the separation of components or chemical reactions are assembled from plates or wall elements provided with plug and clamp connectors along respective edges and formed by strips so that the partitions can be easily and safely assembled and disassembled.

10 Claims, 7 Drawing Sheets

COLUMN PARTITION

FIELD OF THE INVENTION

Our present invention relates to a partition for a column of the type used in physical separations of flowable materials and, or effecting chemical reactions.

The invention also relates to a column equipped with the improved partition of the invention.

BACKGROUND OF THE INVENTION

In the separation of feed stocks into two or more fractions, in order to limit the cost of the apparatus used, it has been proposed to employ columns with vapor or liquid lateral outlet fittings.

The products discharged from the side are, as a rule, not usually pure, i.e. the products are generally contaminated with other components because of incomplete separation of the components of the feeding stock. To produce side-discharged products in a somewhat more pure form, partitioned columns are used.

It is known, for example, to provide a partition in such a column to thereby subdivide the interior of the column into an inlet region and a discharge region. For example, EP 0 122 367 subdivides the interior of a distillation column into inlet and outlet compartments and provides at side of the compartment outlets for the components to be separated above and/or below the inlet fitting for the feed stock. The partition in this system serves to prevent transverse mixing of liquid and/or vapor streams over a limited height of the column. The apparatus reduces the number of distillation columns required for the separation of multicomponent feed stocks.

The partitions can extend between opposite walls of the column and can have heights which, as a rule, can be greater than the column diameter and can be at least equal to the spacing between individual horizontal bottoms of the column.

The use of continuous partitions has, however, a number of drawbacks and these drawbacks are the more serious the greater the diameter of the column.

The incorporation of a one-piece partition in the column is difficult because of its weight and the need for a close fit of the partition in the column. From a certain size, the dimensions of such partitions ensures that they can only be handled with mechanical assistance which can lead to additional costs. Furthermore, with increasing weight, the partitions can pose a greater danger for the workers who are necessary for installation of the partition. It has been found in practice that the partition can easily become canted during installation in the column and can thereby damage the inner wall of the column or result in poor sealing between the column and the partition. Irregularities in the shape of the column can also limit the sealing effectiveness. Since possible nonsealing regions may then have to be sealed up by additional acts, the costs of the column and the partition can be prohibitive.

OBJECTS OF THE INVENTION

It is, therefore, the principal object of the present invention to provide a partition for a separating or reaction column of the type described, whereby the aforementioned drawbacks are eliminated or significantly reduced.

It is another object of this invention to provide an improved partition for the purposes described which can be installed more readily in the column in an economical manner and without the need for machine assistance.

It is also an object of the invention to provide an improved partition for the purposes described whereby, on installation and removal, the risk of injury is substantially reduced.

Still another object of the invention is to provide an improved sealing structure, in particular for the sealing of a partition with respect to the walls of the column.

SUMMARY OF THE INVENTION

These objects and others are attained, in accordance with the invention, with a partition for a separating or reactor column wherein the partition or separator is comprised of two or more wall elements and the wall elements are mutually parallel and preferably coplanar and one of the elements is provided with a connecting device forming a plug or clamp connector along an edge of one of the wall elements so that the other wall element can fit into this connector and more specifically into the slot formed along that edge.

The wall elements of the partition can lie preferably in the same plane and are located one above the other or one alongside the other.

The partition of the invention has the advantage that the partition, rather than being in one piece, can be installed from a multiplicity of loosely assembled wall elements, thereby enabling the partition to be matched individually to the dimensions of the column.

The installation of the partition in the column is simplified and the individual wall elements of the partition, because of their relatively small dimensions, can be comparatively light. The partition can be assembled exclusively by manual effort, i.e. without the need for machines, manipulations or hoists, thereby reducing the cost and the risk of injury to the workers involved in installing the partition.

With this type of assembly in place within the column, it is possible to avoid damage to the partition surfaces as well as to the inner wall surfaces of the column. The light weight of the individual parts of the wall assemblies and the relatively small dimensions of the wall elements by comparison with the inner diameter of the column, enables installation without canting of the wall elements or engagement of the corners thereof with the wall so that there is a better match between the partition and the column wall and hence an improved sealing between the column wall and the partition. Furthermore, the individual partition elements can enable the partition to be accommodated to different widths and heights and thus to permit any optional width or height of the partition to be achieved.

The plug and/or clamping connection enables simple assembly of the individual wall elements since the connection forms a slot into which the second wall element can be inserted, e.g. from above or from the side. Since one of the wall elements is always formed with at least one plug and/or clamping connection, a fixed reliable junction can be provided between the wall elements and, indeed, the configuration of the connection can be such as to enable the wall elements to seal against one another.

According to a feature of the invention the plug and/or clamp connection is mounted adjustably at least on one side of the wall elements of the partition, thereby enabling the partition wall elements to be assembled to any optional width and height. The adjustment of the plug and/or clamp connection can allow small variations in the height or width of the assembled partition to be accomplished. Any conceivable dimensions of the partition can be obtained by appropriate interconnection of the wall elements and any small adjustments required for matching the partition to the interior of the column can be accomplished by utilizing the variability or adjustability of the plug and/or clamp connection.

Advantageously, the plug and/or clamp connection is formed by at least one strip extending parallel to the edge of one of the wall elements but laterally thereof. The strip can form with this edge of the first wall element a gap or slot receiving the edge of the neighboring or second wall element. The strip is affixed to a lateral or broad face of the first wall element.

In another relatively simple construction of the plug and/or clamp connection, the edge of the first wall element is flanked by a pair of strips which extend in the direction of the second wall element and define the slot in which the second wall element is received so that the strips also overlap the second wall element. The lengths of the strips can correspond to the full width of the wall elements or the strips can terminate inwardly of the ends of the edge straddled by these strips.

In still another construction of the connector, a first strip is provided parallel to the edge of the first wall element and a second strip serves as a spacer between this first strip and the surface of the first wall element to which that strip is connected. Because of the presence of the spacer, the strip can form a channel with the edge of the first wall element within which the edge of the second wall element is received, the strip then overlapping the second wall element.

In a particularly simple construction the spacer itself is a strip which is set back from the edge wall element and has a thickness equal to the thickness of the second wall element.

The strips can be located centrally of the width of the wall elements so that, at both ends of the strips, a small spacing remains between the vertical edges of the first wall element and the strips thereon forming the connector.

The spacer can have some other configuration. For example, it can be a nut or another body with a polygonal profile. If the elements of the connector are joined by bolts or screws, a threaded nut forms a simple spacer.

As noted, the distance between the strip of the wall element to which it is affixed and which is maintained by the spacer, can correspond to the thickness of a wall element so that a relatively tight and sealing fit is provided by insertion of the second wall element into the connector on the first wall element.

According to another feature of the invention, the partition wall element which is formed with the connector may be stepped, i.e. formed with a double bend and the depth of the step can correspond to the thickness of the wall element. On the side which is not stepped, the strip can be provided to form the opposite side of the channel. One leg of the strip and the strip an overlap the edge region of the second wall element. In an alternative, the strip can be doubly bent to form the step.

The length of the strips can depend on whether or not edge connectors are provided. For example, an edge connector with at least one strip can extend the full length of the upper edge of a lower wall element if along vertical edges, further connectors are not required. The upper edge connector can be shortened if vertical connectors are necessary to allow other wall elements to adjoin the first wall element at the vertical edges thereof.

The strips provided on two adjoining partition elements can lei in a line and can enjoin one another end to end. For example, a connector that is open upwardly on a lower wall element can adjoin a connector open downwardly on the upper wall element of two wall elements in the same plane.

The strips or spacers can be fastened to one another and to the respective wall elements by spot welding or seam welding, point welds and roller point welds being preferred. The strips can be mounted in additional positions on the respective wall elements in this manner. The weld connections enable a sealed junction between the strips and the wall elements.

A further possibility is to attach the strips and spacers to the wall elements by bolts or screw connections. An advantage of this approach is that the connection can be easily loosened and offsetting or repositioning of the strips is simplified. The width of the channel or slot can be easily adjusted and dismounting of portions of the partition or disassembly of the entire partition is possible. When the column is to be provided with supports extending from the inlet side to the outlet side or the partition is to extend completely across the column and access is available, a screw or bolt connection is particularly advantageous. The strips and the spacers can be composed of metal or plastic and partition wall elements themselves are usually composed of metal. This ensures a sufficient wall thickness of the partitions for stability. The height and width of individual wall elements is variable and it has been found that the height of the individual partition wall elements should be at least equal to the height of a backing which will usually range between 16 and 22 cm. The height is determined by convenience of mounting and the weight and by the accessibility upon installation of the packing structures.

When edges of the partition engage the inner wall of the column, sealing elements can be provided therealong to prevent passage around the edges of liquid or vapor. In the case of irregularities in the inner wall of the column and nonround regions, these sealing strips can be lip-type or flange-type seals which can be composed of metal. When strict tolerances in product purity need not be observed, the seals can be metal fabric and in all cases the sealing lips should be resilient or elastic so as to be able to compensate for irregularities in the column wall. The seals tend to conform to the inner wall of the column and are provided along all edges of the partition which are juxtaposed with the inner wall of the column. A simple mode of attachment of the metal seals is a screw, adhesive or weld connection. With metal fabric lip seals, screw, clamp or adhesive connections are preferred.

The partition wall elements should preferably be rectangular but other shapes, such as triangular shapes can be used. The rectangular shape facilitates assembly.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
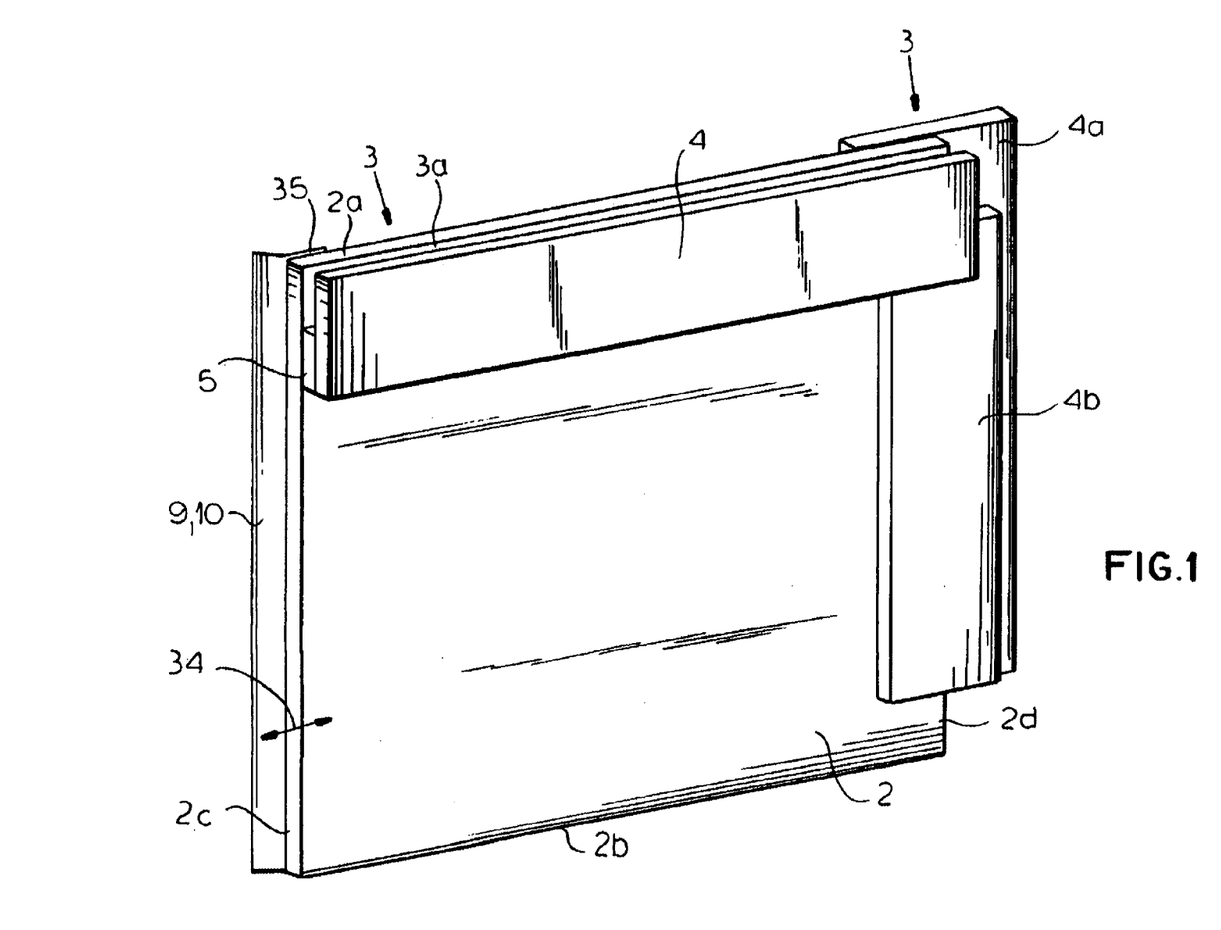
FIG. 1 is a perspective view of a partition wall element showing a sealing lip along one edge and strip-type connectors along two other edges of the partition wall element for use in assembling a column in accordance with the invention.

In FIG. 1 we have shown a rectangular partition wall element 2 which has an upper edge 2a, a lower edge 2b and a pair of vertical lateral edges 2c and 2d.

Figures 12, 13:
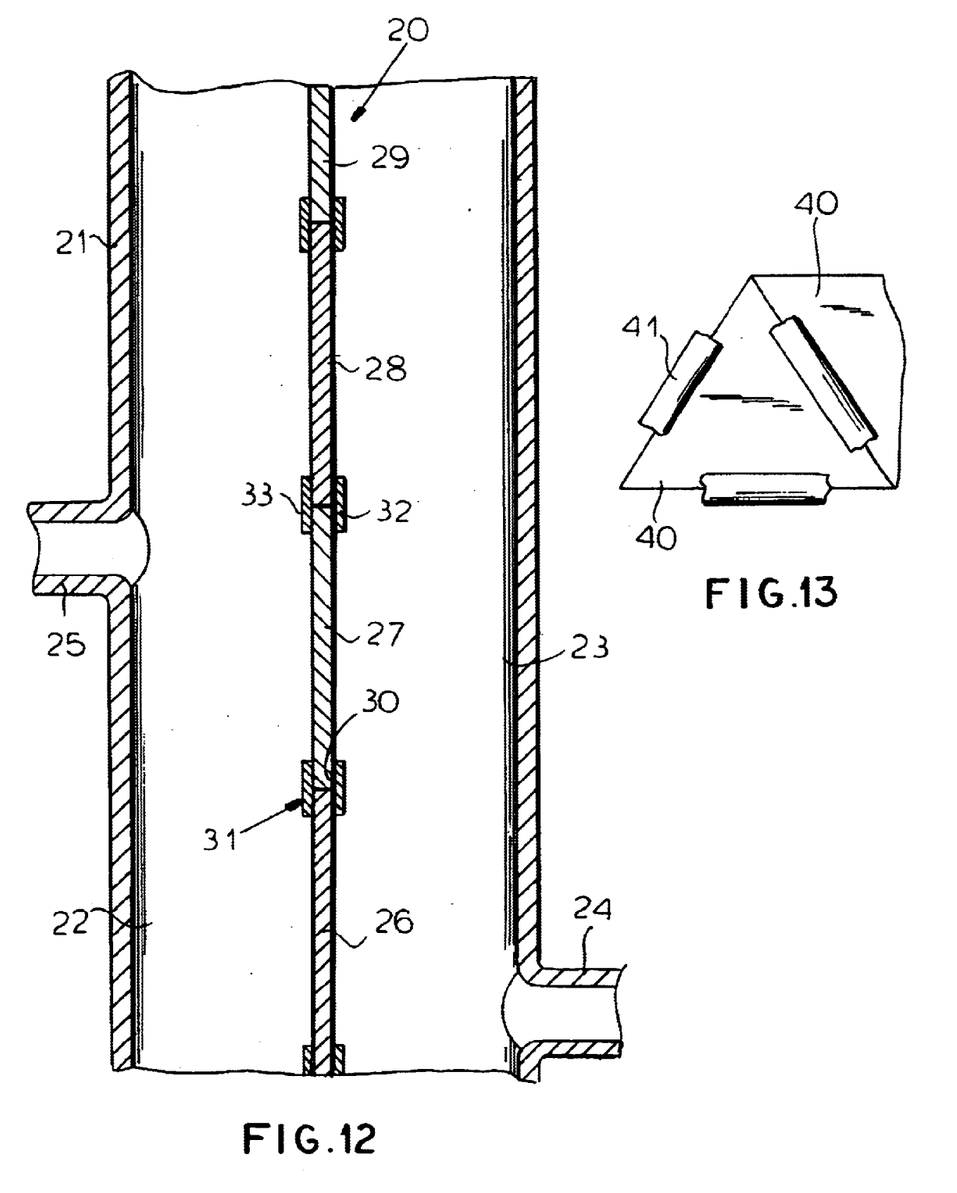
FIG. 12 is a vertical section through a column according to the invention.
FIG. 13 is an elevational view illustrating another partition assembly according to the invention.

As can be seen generally from FIG. 12, such a wall element can be assembled with other similar wall elements to form a partition 20 for a column 21 which can be used for the separation of liquid components by distillation or other mass transfer techniques, or for effecting chemical reactions or both. The partition 20 can then subdivide the column 21 into an inlet compartment 22 and an outlet compartment 23, the latter having one or more lateral outlets 24 shown as tubular fittings communicating with the interior of the column.

An inlet fitting 25 opens laterally into the column to deliver a feed stock thereto and the column may additionally be provided with bottoms extending transversely, i.e. horizontally, for further baffling or with packing. The partition extends part of the height of the column and above and below the partition, condenser and boiler lips can be provided as in European patent application 0 122 367 mentioned previously.

From FIG. 12 it will be apparent that a multiplicity of such wall sections 26, 27, 28 and 29 are assembled in mutually parallel relationship by, for example, fitting the lower end of each section into an upwardly open slot 30, for example, in a respective connector 31 provided along the top edge of each lower wall section. The connectors can be formed by strips 32 and 33, for example. The wall sections are coplanar in FIG. 12 and can be laterally offset by the thickness of one of the wall sections when assembled from wall sections 2 of FIG. 1.

Returning to FIG. 1, it can be seen that, proximal to the upper edge 2a of the wall element 2, a first strip 4 extends substantially the full width of the wall element 2 parallel to the edge 2a and is spaced from the wall element 2 by a second strip 5 serving as a spacer. The two strips 4 and 5 form a plug and/or clamp connector shown generally at 3 which forms a channel or slot 3a in which the lower edge 2b of the next higher wall element is received.

Along the edge 23c which is to seal against the inner wall of the column, a lip seal or strip 9, 10 can be provided.

Alongside of the partition wall element 2 which is not bounded by the inner wall of the column, two strips 4a and 4b straddle the edge 2c so that these strips overlap the wall element 2 and form a lateral slot or channel in which a side of adjoining wall element 2 can be received.

The front strip 4b is spaced from the upper and lower edges 2a and 2b by the same distance as the strip 5 is spaced from the upper edge 2a while the rear strip 4 extends to the upper edge 2 of the wall element 2.

The strips 4, 4a, 4b, 5 are so dimensioned that when the wall elements 2 are fully inserted vertically and laterally into the respective slots, the strips 4, 4a and 4b overlap these adjoining wall elements 2 and form continuous sealed connections between them. While the adjoining wall elements are overlapped by the strips 4, 4a, 4b, the adjoining wall elements can be separated in their respective planes from one another (i.e. enable relative adjustment of the wall elements in the planes thereof) and any gaps between adjoining wall elements can be bridged by the strips 4a, 4b. The partition can thereby span between opposite sides of the column see FIG. 8). More particularly the connector along the edge of one of the wall elements receives an edge of the other wall element enabling relative adjustment of the wall elements in planes thereof to enable the partition to span between opposite sides of said column.

The sealing elements 9 may be formed as sealing lips 10 of thin slit sheet metal or sheet metal screen. The sealing elements 10 can be adjustably mounted on the edge 2c as represented by the double-headed arrow 34 to allow compensation for the width of the gap between the inner wall of the column and the edge 2c. This adjustability is afforded by the overlapping relationship of the flange 35 of the sealing lip 10 and the plate 2.

The resiliency or elasticity of the sealing lip 10 ensures a tight fit to the column wall. Preferably the sealing lip 10 is composed of sheet metal although sealing lips of metal fabric have been found to be suitable when the requirements for product purity are not strict. Sealing elements 9 of other materials, for example, plastics, can also be used.

Figure 2:
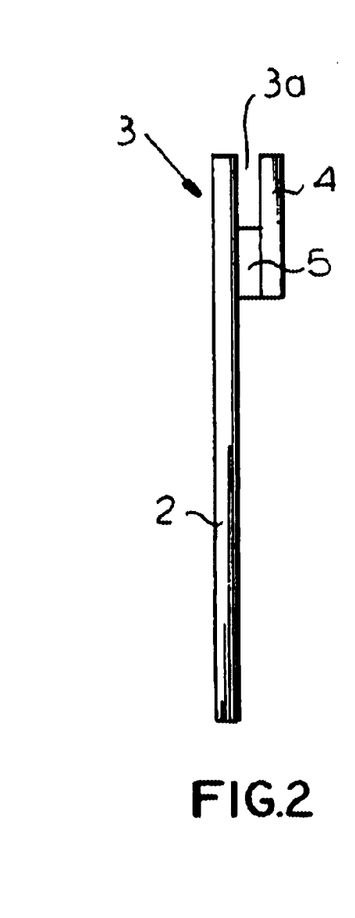
FIG. 2 is a side view of a partition wall element utilizing a spacer strip.

FIGS. 2–5 represent side views of partition wall elements 2 and various clamping or plug connections 3. For example, FIG. 2 shows the partition 2 with first and second strips 4 and 5 as described in connection with FIG. 1, wherein the second strip 5 is a spacer. Weld seams can be provided between the strips and between the intermediate strips 5 and the plate 2. The channel or slot 3a has been shown in FIG. 2 and receives the lower edge portion of the next higher partition wall element 2 which can be so inserted that a tight connection between the neighboring wall elements 2 is formed.

Figure 3:
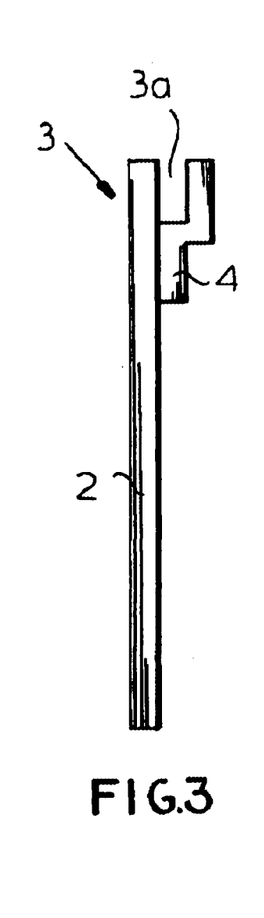
FIG. 3 is a view similar to FIG. 2 showing the use of a doubly-bent strip.

FIG. 3 shows an alternative wherein the single strip 4 forming the slot 3a with the plate 2 along the upper edge is a double-bent member having the configuration of a step.

Figure 4:
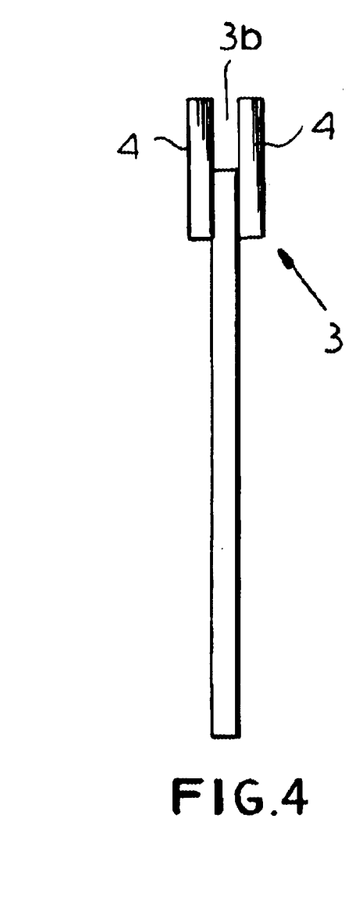
FIG. 4 is a view similar to FIG. 2 of an embodiment in which two strips form the connector by straddling the wall element.

FIG. 4 shows an embodiment similar to that seen in FIG. 12 in which the upper edge of the plate 2 is straddled by two strips 4 defining a slot 3b receiving the lower edge of the next higher wall element so that the wall elements are coplanar.

Figure 5:
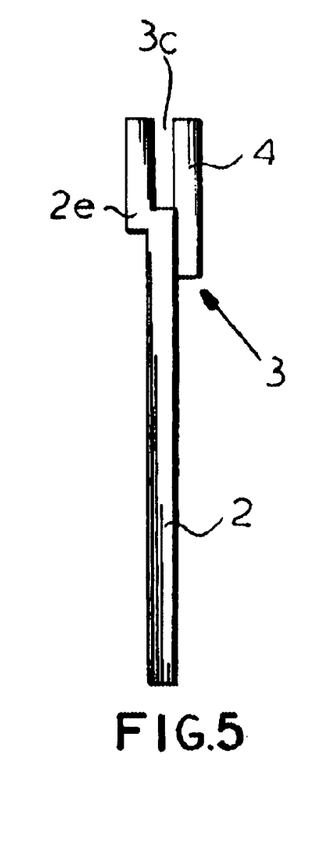
FIG. 5 is a view similar to FIG. 2 of an embodiment in which the edge portion of the wall element is provided with a step.

Another coplanar arrangement is possible with the configuration of FIG. 5 in which the upper edge of the plate 2 is formed with a step 2e and the slot 3c is defined with this stepped portion of the plate and a strip 4 attached to the plate on the opposite side from the step.

All of these strips have a sufficient area and overlap to with the inserted late as to ensure secure retention thereof.

Figure 6:
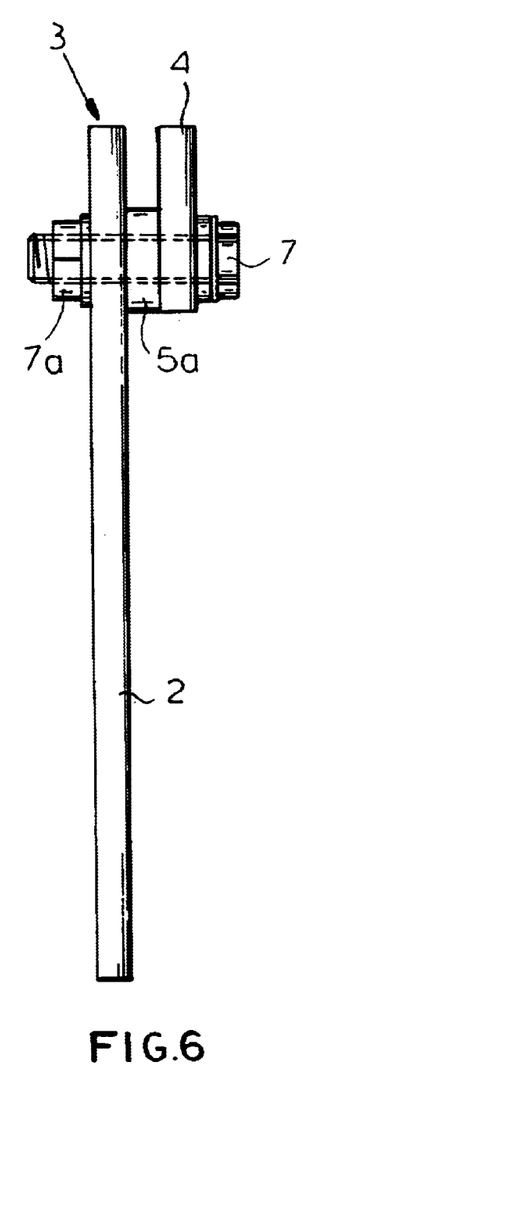
FIG. 6 is a side view of a partition wall element utilizing a bolted connection.
Figure 7:
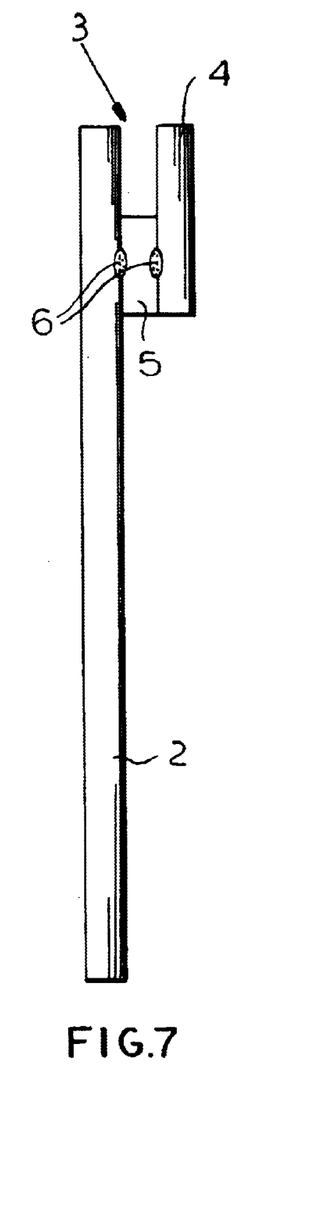
FIG. 7 is a view similar to FIG. 6 illustrating a welded connector.

FIGS. 6 and 7 show alternative methods of fastening the strips to the plate to form the plug or clamp connector 3. In FIG. 6 bolts 7 and nuts 7a serve to connect the strip 4 to the plate 2 and, in this embodiment, the spacer can be either a strip 5 as has been described or a nut 5a of the same thickness as the plate 2 and has the spacer strip 5. The strip 4, strip 5 when it is used as a spacer, and the plate 2 can be formed with slots receiving the bolt 7 to enable adjustment of the location of the connector 3 with respect to the edge and thus the relative positions of two adjoining wall elements. The screw connection facilitates release of the connector and dismantling of the partition and reassembly thereof.

FIG. 7 shows that weld connections 6 can be provided between the strips 4 and 5 and between strip 5 and the plate 2. The welds can be spot welds formed by point or roller welding techniques. Adhesives can also be used to secure the connector elements to the plates and to each other, especially when the strips and usually the plate 2 are formed as synthetic resin or plastic elements.

Figure 8:
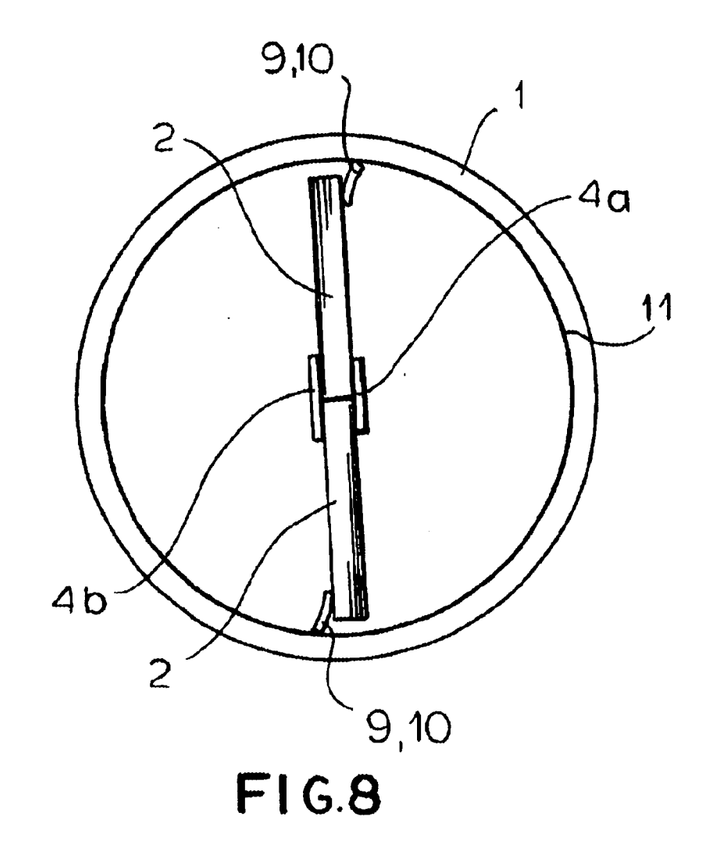
FIG. 8 is a transverse section through a column showing two wall elements adjoining along vertical edges to extend the full diameter of the column.

FIG. 8 shows a transverse section through the column 1 with a partition formed by two wall elements 2 extending across the breadth of the column and connected by strips 4a and 4b forming the plug and clamp connector. Sealing elements 9 or sealing lips along the outer edges of the partition engage the inner wall of the column.

The wall elements need not be of the same sizes throughout the partition and, for example, the junctions between the wall elements can be offset from one another for successive pairs of the wall elements. In the region of the strips 4a and 4b, the wall elements 2 can be pulled apart so as to better fit the interior of the column.

Figure 9:
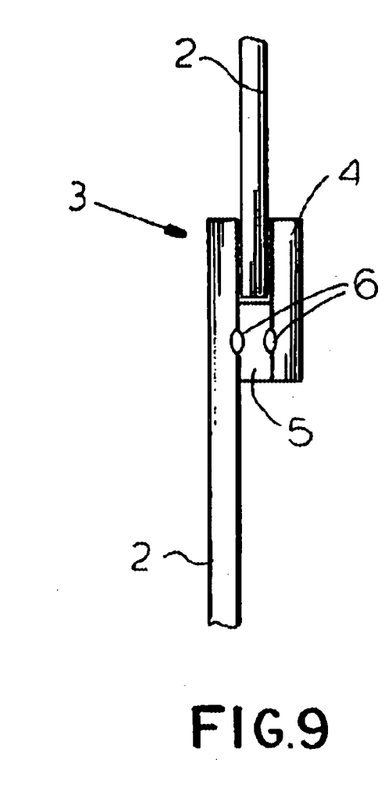
FIG. 9 is a view from the side showing two wall elements assembled together.

FIG. 9 shows the assembly of two wall elements 2 in an embodiment similar to that of FIG. 7, the lower edge of the upper wall element 2 fitting snugly into the channel formed by the connector 3 at the upper edge of the lower wall element.

Figure 10:
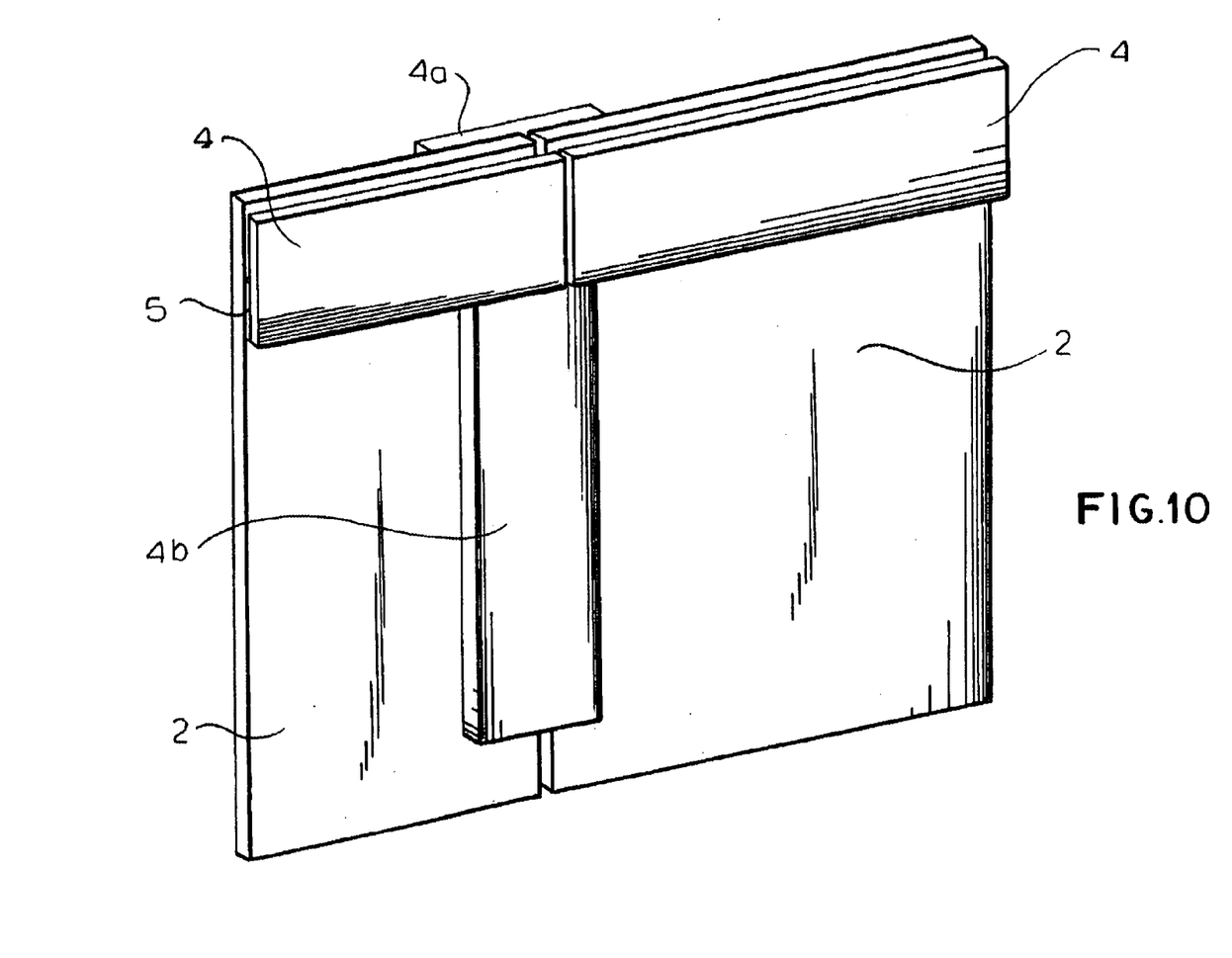
FIG. 10 is a perspective view showing an assembly of wall elements in which the upper connectors are aligned.

FIG. 10 shows two laterally adjoining wall elements 2 in which the gap between them is covered largely by the strips 4a and 4b.

Figure 11:
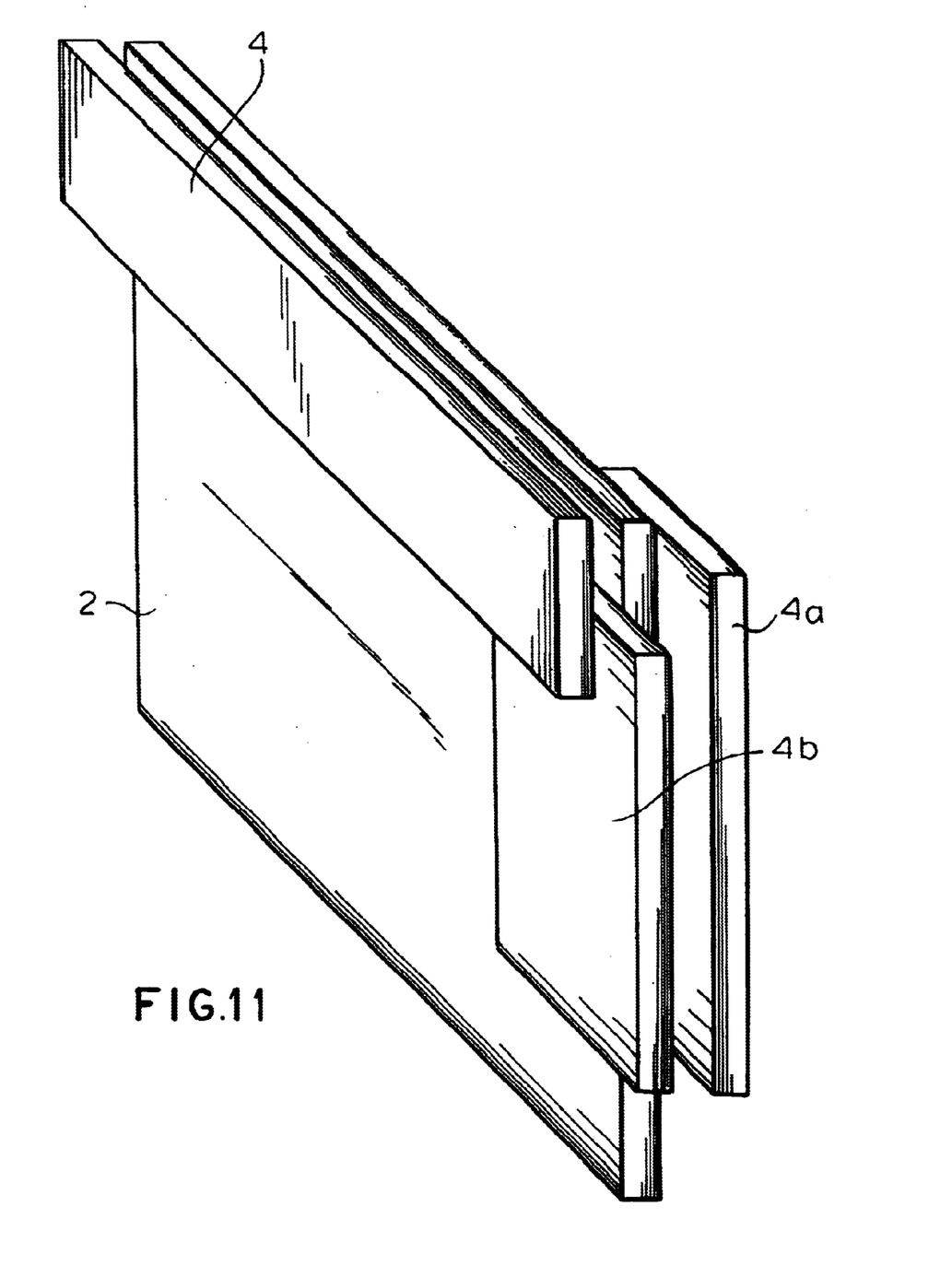
FIG. 11 is a perspective view of one of the wall elements in the configuration of FIG. 10.

FIG. 11 shows the strips 4, 4a and 4b and the gap between the strips 4a and 4b in greater detail.

As will be apparent from FIG. 13, the wall elements 40 need not be rectangular and can have triangular configurations while strips 41, which are shown only fragmentarily, allow the edges of other triangular plates to be inserted and assembled to form a partition.

We claim:

1. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, said connector including a pair of strips affixed to opposite faces of said one of said wall elements and projecting beyond said edge of said one of said wall elements to form a slot receiving the other wall element and overlapping opposite faces thereof at said edge of said other wall element.

2. A partition for a column having means for separation of substance or for chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of column, said connector including a first strip mounted on said one of said wall element parallel to said edge of said one of said wall elements and a spacer between said strip and a face of said one of said wall elements whereby said strip defines a slot with said one of said wall elements along the edge of said one of said wall elements, said slot receiving said edge of said other wall element, said strip overlapping said other of said wall elements.

3. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall element in planes thereof to enable said partition to span between opposite sides of said column, said connector including a step formed in said edge of said one of said wall elements in which said edge of said other wall element is received, and a strip juxtaposed with said other wall element, secured to said one of said wall elements and defining a slot with said step, said edge of said other wall elements being received in said slot.

4. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, and a strip of stepped cross section secured to said one of said wall elements and forming said connector, said strip defining said slot receiving said edge of said other wall element.

5. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, said connector including at least one strip connected by spot welds to said one of said wall elements along said edge of said one of said wall elements.

6. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, said connector including at least one strip fastened along said edge of said one of said wall elements and secured thereto by threaded bolt connections.

7. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, and sealing elements along at least one edge of the partition contacting a wall of said column, said sealing elements being composed of thin slitted sheet metal or a metal fabric.

8. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, and sealing elements along at least one edge of the partition contacting a wall of said column, said sealing elements being resilient sealing lips.

9. A Partition for a column having means for separation of substance or for a chemical reaction, comprising at least two mutually parallel wall elements disposed substantially contiguously with one another, and a connection along an edge of one of said wall elements receiving an edge of the other wall element enabling relative adjustment of said wall elements in planes thereof to enable said partition to span between opposite sides of said column, lateral faces of said wall elements being rectangular or triangular.

10. A partition for a column having means for separation of substance or for a chemical reaction, comprising at least two mutually parallel wall elements disposed substantially contiguously with one another, and a connector along an edge of one of said wall elements receiving an edge of the other wall element enabling relative adjustment of said wall elements in planes thereof to enable said partition to span between opposite sides of said column, said connector including at least one strip overlapping said other all element and affixed to said one of said wall elements and forming a sealing connection between said wall elements at said edged thereof.

\* \* \* \* \*